(12) United States Patent
Kabra et al.

(10) Patent No.: US 10,452,627 B2
(45) Date of Patent: Oct. 22, 2019

(54) COLUMN WEIGHT CALCULATION FOR DATA DEDUPLICATION

(71) Applicant: International Business Machines Corporation, Armonk, NY (US)

(72) Inventors: Namit Kabra, Hyderabad (IN); Yannick Saillet, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 15/171,200

(22) Filed: Jun. 2, 2016

(65) Prior Publication Data

US 2017/0351717 A1    Dec. 7, 2017

(51) Int. Cl.
*G06F 7/00* (2006.01)
*G06F 16/215* (2019.01)
*G06F 16/21* (2019.01)
*G06F 16/174* (2019.01)

(52) U.S. Cl.
CPC ........ *G06F 16/215* (2019.01); *G06F 16/1748* (2019.01); *G06F 16/217* (2019.01)

(58) Field of Classification Search
CPC ......... G06F 17/30303; G06F 17/30156; G06F 3/0641; G06F 11/1453; G06F 17/3015; G06F 17/30489
USPC ........................... 707/692, 602, 662, 999.101
See application file for complete search history.

(56) References Cited

U.S. PATENT DOCUMENTS

| | | | | |
|---|---|---|---|---|
| 6,529,892 | B1 * | 3/2003 | Lambert | G06F 17/2725 706/55 |
| 7,155,427 | B1 * | 12/2006 | Prothia | G06F 17/30595 707/694 |
| 7,403,942 | B1 * | 7/2008 | Bayliss | G06F 17/30303 707/748 |
| 7,657,540 | B1 | 2/2010 | Bayliss | |
| 7,912,842 | B1 * | 3/2011 | Bayliss | G06F 17/30545 707/749 |
| 8,332,366 | B2 | 12/2012 | Schumacher et al. | |
| 8,515,971 | B2 * | 8/2013 | Beaudet | G06K 9/6292 382/115 |
| 8,560,506 | B2 | 10/2013 | Chaturvedi et al. | |
| 8,676,838 | B2 | 3/2014 | Bayliss | |
| 9,507,824 | B2 * | 11/2016 | Young | G06F 17/30454 |

(Continued)

OTHER PUBLICATIONS

Kabra, N., "Identifying duplicates in your data using InfoSphere QualityStage," IBM developerWorks, Jun. 30, 2015, 32 pages, IBM Corporation. http://www.ibm.com/developerworks/data/library/techarticle/dm-1505duplicates-infosphere-qualitystage/index.html.

(Continued)

*Primary Examiner* — Mohammed R Uddin
(74) *Attorney, Agent, or Firm* — Peter K. Suchecki

(57) ABSTRACT

A computer system with the capability to identify potentially duplicative records in a data set is provided. A computer may collect a data profile for the data set that provides descriptive information with regard to attributes of the data set. Based, at least in part, on the data profile, weights are determined for the attributes. As values of a data record are compared to values of the same respective attributes in other records, the overall likelihood of a match or duplicate, as indicated by the degree of similarity between values, is modified based on the determined weights associated with the respective attributes.

19 Claims, 5 Drawing Sheets

(56) References Cited

U.S. PATENT DOCUMENTS

| | | | |
|---|---|---|---|
| 2006/0129427 A1* | 6/2006 | Wennberg | G06F 19/328 705/2 |
| 2008/0077573 A1* | 3/2008 | Weinberg | G06F 17/30495 |
| 2010/0169348 A1* | 7/2010 | Maro | G06F 17/30489 707/758 |
| 2010/0191748 A1* | 7/2010 | Martin | G06F 17/30675 707/750 |
| 2013/0151487 A1 | 6/2013 | Chaturvedi et al. | |
| 2013/0262406 A1* | 10/2013 | Kumar | G06F 17/30569 707/692 |
| 2014/0222793 A1* | 8/2014 | Sadkin | G06F 17/3053 707/723 |
| 2014/0229482 A1* | 8/2014 | Milenova | G06F 17/30289 707/737 |
| 2014/0281729 A1 | 9/2014 | Goldenberg et al. | |
| 2014/0330845 A1 | 11/2014 | Feldschuh | |
| 2015/0178346 A1* | 6/2015 | Bailey | G06F 17/30303 707/691 |
| 2015/0199744 A1* | 7/2015 | Tolvanen | G06Q 30/0631 707/737 |
| 2015/0242408 A1* | 8/2015 | Frohock | G06F 17/30345 707/749 |
| 2016/0055205 A1* | 2/2016 | Jonathan | G06F 17/30454 707/714 |

OTHER PUBLICATIONS

"Understanding Data De-duplication," Transoft White Paper, 9 pages, © Transoft Group Limited and Transoft Inc 2012. http://www.transoft.com/Blog/file.axd?file=2012%2F8%2FData_Deduplication_June12.pdf.

"Warehouse Builder Data Modeling, ETL, and Data Quality Guide: 23 Matching, Merging, and Deduplication," Oracle Help Center, 32 pages, printed Nov. 27, 2015, Copyright © 2015 Oracle. http://docs.oracle.com/cd/E11882_01/owb.112/e10935/match_merge.htm#BGBEEAJE.

Peleg, G., "Matching Policy—A Closer Look into Data Quality Services Data Matching," Data Quality Services Blog, Microsoft | Developer, Nov. 2, 2011, 6 pages http://blogs.msdn.com/b/dqs/archive/2011/11/02/matching-policy-a-closer-look-into-data-quality-services-data-matching.aspx.

"Weight calculations," IBM InfoSphere DataStage and InfoSphere Quality Stage, Version 8.5, IBM Knowlege Center, Sep. 20, 2012, 1 page. http://www-01.ibm.com/support/knowledgecenter/SSZJPZ_8.5.0/com.ibm.swg.im.iis.qs.ug.doc/topics/logarithm.html.

Kabra et al., "Column Weight Calculation for Data Deduplication," U.S. Appl. No. 15/807,258, filed Nov. 8, 2017.

List of Patents or Patent Applications Treated as Related, Signed Nov. 8, 2017, 2 pages.

* cited by examiner

| | FIRST NAME | MIDDLE NAME | LAST NAME | SSN | SEX | AGE | CITY | EMAIL |
|---|---|---|---|---|---|---|---|---|
| 202 | JOHN | E. | DOE | 111-22-3333 | M | 37 | DULUTH | JDOE@EMAIL.COM |
| 204 | JOSEPH | ROBERT | SMITH | 123-23-3456 | M | 26 | CHICAGO | SMITH@EMAIL.COM |
| 206 | JANE | E. | DOE | 333-33-3333 | F | 32 | NEW YORK CITY | |
| 208 | JOHNN | EVERY | DOE | 111-22-3333 | M | 37 | DULUTH | |
| | 10 | 2 | 8 | 12 | 4 | 2 | 6 | 1 |

COLUMN WEIGHT CALCULATION FOR DATA DEDUPLICATION

BACKGROUND

The present invention relates to data deduplication methods, and more particularly, automatic computation of column weights for increased effectiveness of entry/record matching in data deduplication processes.

Data deduplication is a technique for finding and eliminating duplicate data records in a large data set. "Duplicate data records" may include records that are not fully identical but still represent the same entity (e.g. the same customer, client, etc.). For example, a company may have duplicate data records in a customer database if the same customer registered multiple times using slightly different data (e.g., different email addresses, different phone numbers, different mailing addresses, etc.). Deduplication processes allow for removal of duplicates or the merging of duplicative records such that each unique entity is only represented once. Effective deduplication processes are highly useful in ensuring that various computations, analyses, and/or representations are not inappropriately skewed by duplicate records (or by removal of non-duplicative records).

SUMMARY

Embodiments of the present invention disclose a method, computer program product, and system for identifying potentially duplicative records in a data set. In one aspect, a computer collects a data profile on the data set, where the data set comprises a plurality of data records organized by distinct attributes, such that separate elements of each record belong to a distinct attribute of the data set, and where the data profile provides descriptive information regarding the attributes, including at least a data classification for one or more of the attributes. The computer determines a weight to be associated with a particular attribute based, at least in part, on the data profile. The computer compares at least one element of a first record of the data set to at least one element of a second record of the data set, where both the element of the first record and the element of the second record are associated with the particular attribute of the data set, to determine a degree of similarity between the two elements. The computer determines a likelihood that the first and second records are duplicative over each other, based, at least in part, on the degree of similarity between the two compared elements, where the effect that the degree of similarity between the two compared elements has on the overall determination as to the likelihood that the first and second records are duplicative is increased or decreased based on the determined weight associated with the particular attribute.

BRIEF DESCRIPTION OF THE SEVERAL VIEWS OF THE DRAWINGS

FIG. 2 schematically illustrates a data set comprising a plurality of data records, in accordance with an embodiment of the present invention.

DETAILED DESCRIPTION

Embodiments of the present invention recognize that in comparing records of a data set for potential duplicates, different attributes of the records may have different levels of usefulness in determining similarity between two records and ultimately in whether two records refer to the same entity. For example, a mismatch in a "middle name" field may have less importance in such a comparison as, in addition to a textual spelling of the middle name, it would not be uncommon to represent a middle name by a middle initial, or to omit the middle name completely. A mismatched "social security number" field, on the other hand, is likely to have a much higher significance to such a comparison, as social security numbers are designed to be unique to individuals, and are not likely to change over time. Embodiments of the present invention utilize data profiling of the data set to collect and analyze relevant information from and regarding the data set, and ultimately assign weighting to the columns (representative of record attributes) for the data set such that more or less significance is given to a match or mismatch of an attribute of one record when compared to the same attribute of a second record.

Implementation of such embodiments may take a variety forms, and exemplary implementation details are discussed subsequently with reference to the Figures.

Figure 1:
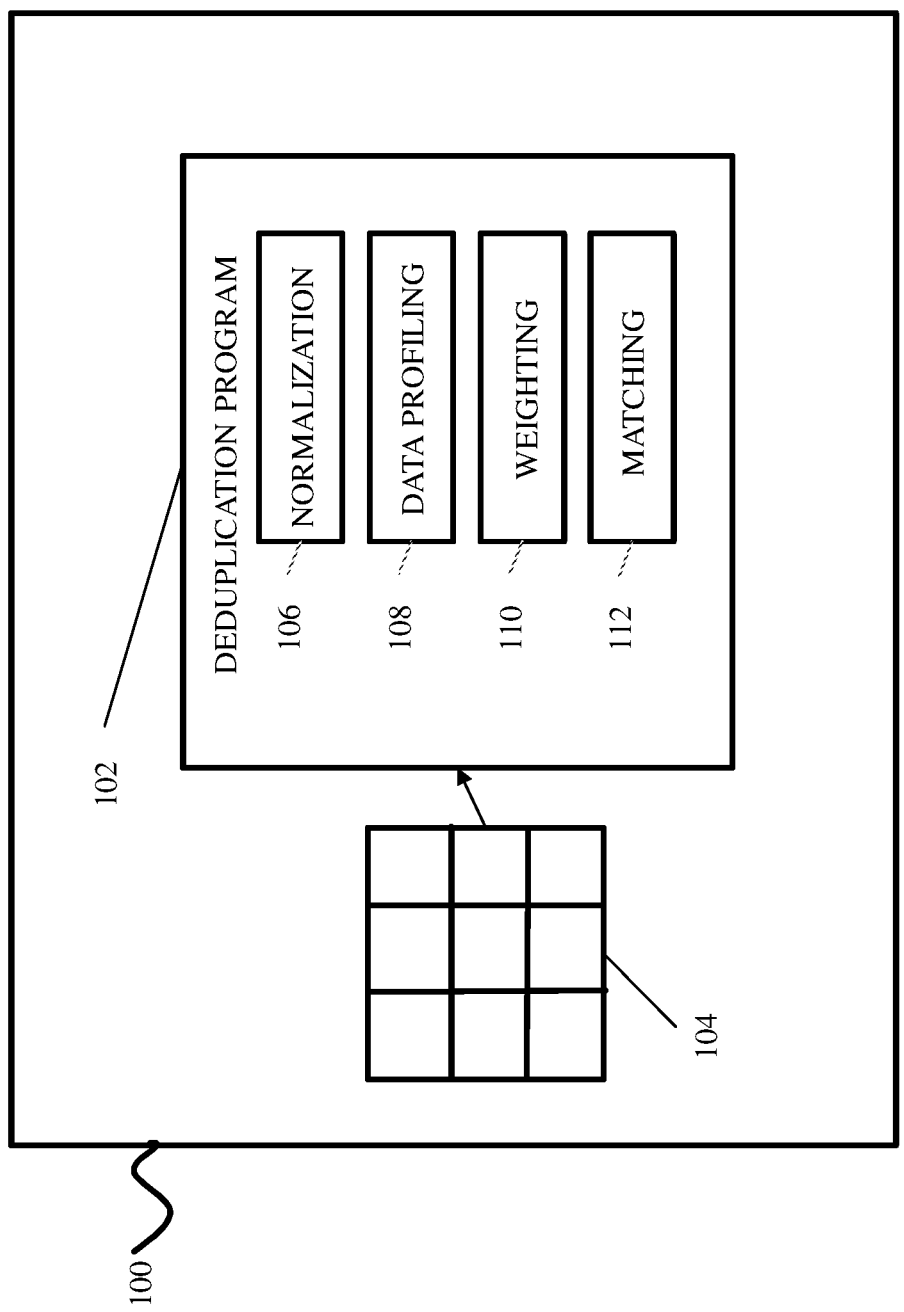
FIG. 1 is a functional block diagram illustrating a data processing system, in which embodiments of the present invention may execute.
Figure 5:
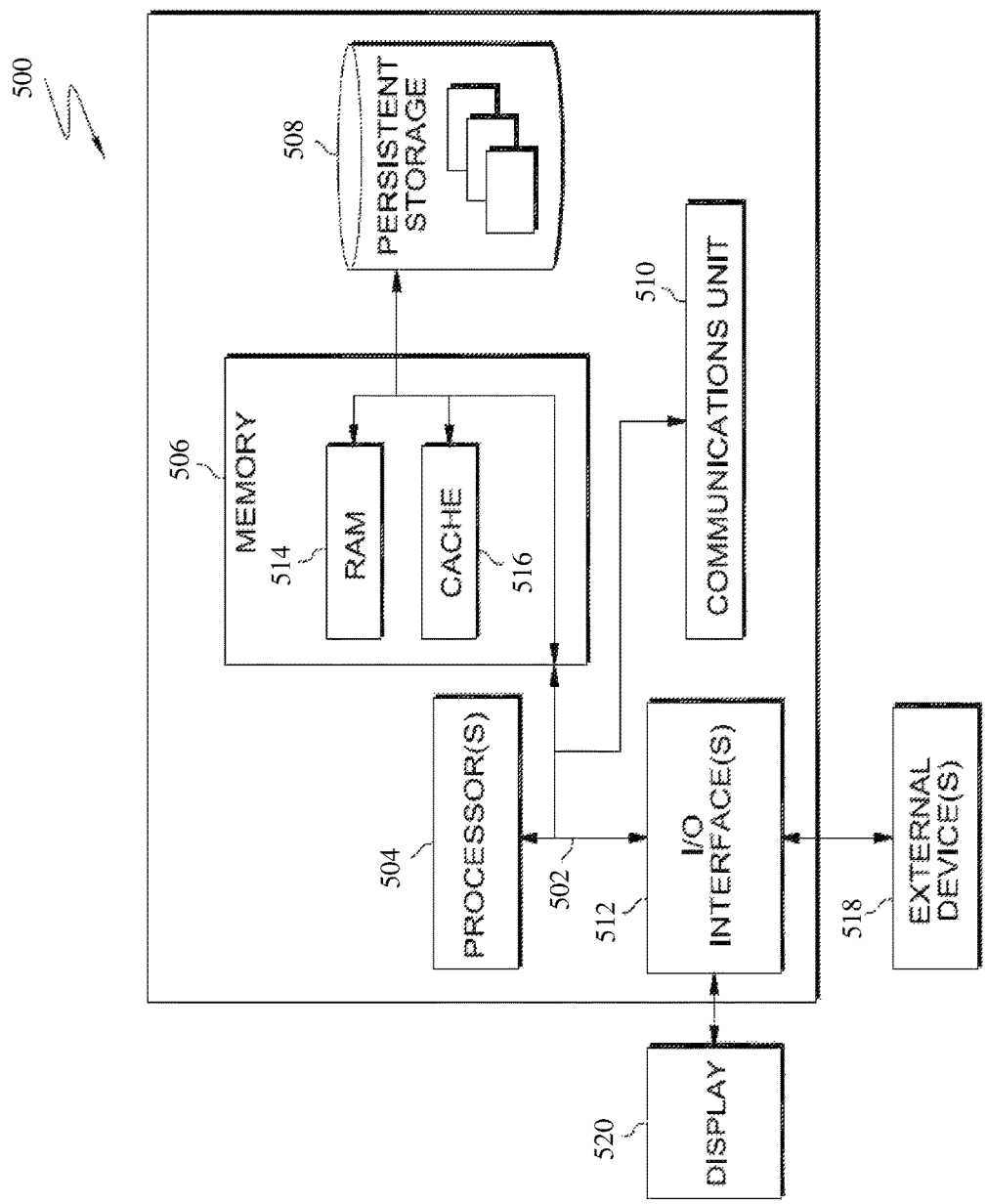
FIG. 5 depicts a block diagram of components of the data processing system, in accordance with an illustrative embodiment of the present invention.

FIG. 1 is a conceptual block diagram illustrating a data processing system, generally designated 100, in which an embodiment of the present invention can be implemented. Data processing system 100 may be a desktop computer, laptop computer, a specialized computer server, a client computer, or any other computer system known in the art. In certain embodiments, data processing system 100 may represent a computer system utilizing clustered computers and components that act as a single pool of seamless resources when accessed through a network, as is common in data centers and with cloud computing applications. In general, data processing system 100 is representative of any programmable electronic device or combination of programmable electronic devices capable of executing machine-readable program instructions. Exemplary components of data processing system 100 are depicted in FIG. 5.

Deduplication program 102 resides on data processing system 100 and ultimately compares records in a data set (e.g., data set 104) for similarities and determines potential duplicates. In the determination, deduplication program 102 provides differing weights to columns (representative of record attributes) based on collected and analyzed data regarding the data set. Logically, deduplication program 102 may utilize a number of processes to complete its tasks including, for example, normalization process 106, data profiling process 108, weighting process 110, and matching process 112.

Normalization process 106 represents a process that acts to normalize (or standardize) entries in the respective data fields for deduplication program 102. For example, normalization process 106 may standardize a particular format used within a field or attribute, such that comparison between the same fields of different records may be more accurately, or easily, compared.

Data profiling process 108 represents a process that collects information, statistics, and/or metadata from the data set and provides it for use by deduplication program 102. The collected information is typically used to describe and classify the data, and for purposes of deduplication program 102, may include information specifically focusing such descriptions and classifications to the columns of the data set. The collective information, statistics, descriptions, classifications, etc. may be referred to as a "data profile" of the data set. Collected information in regard to a specific column or record attribute may, in a non-exclusive list, include:

- a number of distinct values and/or entries with regard to a specific column or record attribute;
- a number of null values with regard to specific column or record attribute;
- formats of data within a specified column;
- types of data (e.g., text, numerical, percentage, etc.);
- min value, max value;
- data category/semantical meaning of the data (e.g. name, phone number, email address, etc., and often inferred from format and/or type of data); and
- data quality, where "quality" refers to how closely (or far) the data in entries of a column compare to an expectation of what the data should be, based on, for example, the determined data category, or expected format or data type, etc.—this may also be referred to as a "trust index," and ultimately indicates a degree in which a program or user can trust that an entry pertaining to a specific record attribute will comply with the expectation based on a given column. In some embodiments, this index may include a percentage of entries in a column compliant with a given expectation.

Weighting process 110 represents a process by which data deduplication program 102 determines and provides weighting factors to the columns based on consideration of the data profile for the data set. Exemplary implementation details are provided subsequently with regard to FIG. 4.

Matching process 112 represents a process of comparing respective attributes/columns of entries within the data set, utilizing the previously determined weights, to ultimately determine the likelihood that one or more entries are duplicative over another entry. Determined duplicates may be merged into a single entry, or otherwise removed.

In one embodiment, when two data records are compared with each other, the values of data elements falling into the same field or attribute are compared. A match score may be given indicating the degree of similarity between the data values in the record attribute. Identical values, for example, would typically be given the highest possible match score. The scores from attribute comparison may then be increased or decreased by a factor determined by the weight assigned to that attribute. And finally, these adjusted scores may be combined for a total match score for the two records. Pairs of records having a match score above a certain threshold may be candidates for being marked as duplicates. In another embodiment, if the match score between two records is below a lower threshold, then the records are automatically identified as being different, while if the match score is above a higher threshold, the records may be automatically identified as being duplicates. If the match score is between the lower and higher thresholds, one implementation would then require a user or administrator to provide a final determination.

As depicted, normalization process 106, data profiling process 108, weighting process 110, and matching process 112 are subprograms, routines, or functions of deduplication program 102. In an alternate embodiment, one or more of the processes may be implemented as distinct programs operating on data processing system 100 and interacting with deduplication program 102.

FIG. 2 depicts an example data set, data set 104, which demonstrates a data table construct (a reduced and simplified data table for discussion purposes), as might be analyzed by deduplication program 102. In the present example, data set 104 is arranged with each row representing an entry or record in the data set, and where each entry includes a number of comparable attributes, aligned by column. As depicted, attributes of the records include: first name, middle name, last name, Social Security Number, gender, age, city, and email. A person of skill in the art will recognize that additional and/or alternative attributes may be utilized.

Entries 202, 204, 206 and 208 are separate entries of data set 104. Entries 202 and 208 represent the same unique entity, and, in a preferred embodiment, would be merged into a single entry upon execution of deduplication program 102. At a glance, a human might quickly ascertain the duplicative nature of the entries, however, what a human may do intuitively, may be much more complex for a computer system. As discussed previously, a middle name attribute may not be the strongest indicator of a match. For example, as depicted, entry 202 and entry 206 would technically provide a middle name match, but are clearly not duplicate entries. In contrast, duplicative entries 202 and 208, do not actually match in middle name at all.

The weight assigned to the columns/data attributes is important to prevent columns having optional data, non-critical data, or data which may change frequently from having a disproportionate impact on a match score between two entries. In one embodiment, weights may be assigned dynamically during a specific run of deduplication program 102. In another embodiment, the "weighting" can be performed on a data set any time after a data profile has been collected. In such an embodiment, and as depicted in FIG. 2, deduplication program 102 may save the determined column weights within the table of data—allowing for easy access whenever needed by deduplication program 102.

Figure 3:
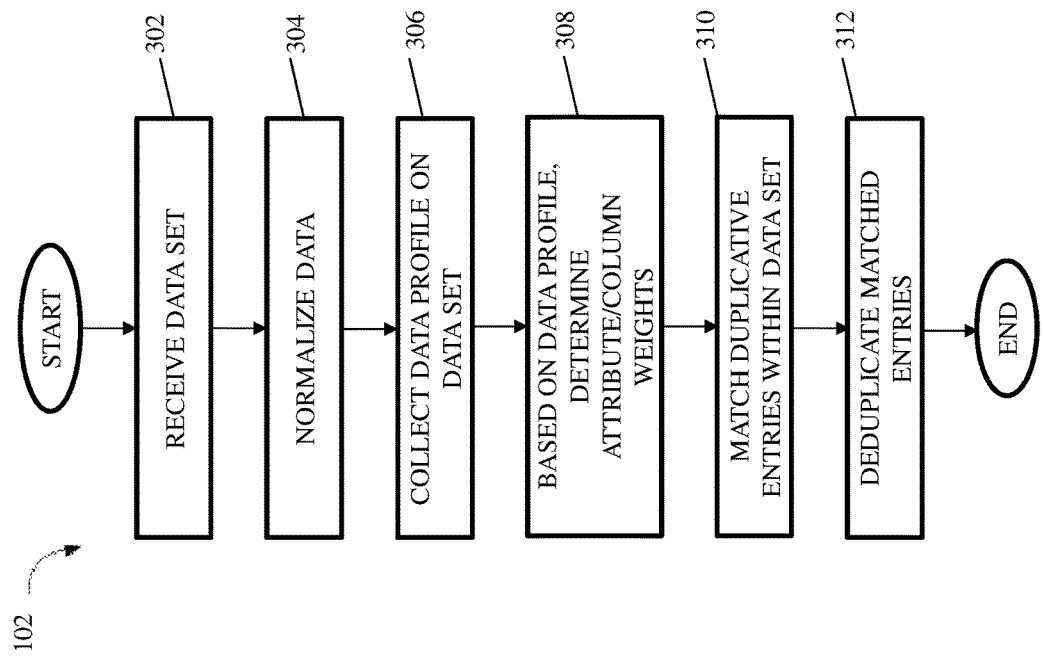
FIG. 3 is a flow diagram describing a high level deduplication program according one embodiment of the present invention.

FIG. 3 illustrates a sequence of actions taken by deduplication program 102, in accordance with one embodiment of the present invention, and, as described in this implementation, is inclusive of processes 106, 108, 110, and 112. First, deduplication program 102 receives a data set (step 302) for analysis. In a preferred embodiment, the data set is formatted as a table, with rows representing separate entries, and columns representing attributes (or fields) of the entries. In other embodiments, the data may be arranged and/or structured according to a different format. Deduplication program 102 may receive a file including the data set, or alternatively may access or be given access to a database containing the information.

Deduplication program 102 normalizes the data (step 304). As previously described, the objective of data standardization/normalization is to obtain a common data format of data values associated with a certain data attribute. For example, one column of a data set may include information regarding the data attribute "telephone number." Telephone numbers can be provided in different formats, e.g., "(541) 754-3010" or "+1-541-754-3010." In order to obtain data values to be compared with respect to their similarity/identity, a common data format may be useful. Some embodiments may, however, be devoid of the normalization process.

Deduplication program 102 collects a data profile on the data set (step 306), such that various information, categories, metadata, statistics, and other descriptive information regarding the attributes of the data set can be subsequently utilized. In different embodiments, the data profiling may be performed before or after data normalization. An accurate data profile (or description of an attribute or column) is most accurate after normalization. For example, a measure of quality/consistency may better assessed after an attempt is made to place the data into a common format. However, small pieces of information may be lost to normalization. In such instances a profile collected prior to normalization may be helpful. In yet another embodiment, deduplication program 102 may perform an iteration whereby it collects a data profile on a raw version of the data set, subsequently normalizes the data, and collects a second data profile on the normalized data set. From the two collections, a more complete profile of information related to the data set attributes may be created.

The collected data profile may be used to classify the data and describe the data within each distinct attribute or column. Such a data class may be directly derived from the data profiling process (e.g., data type, format, etc.), or may be cross-referenced with other accessible information (a business catalogue, for example) to derive the data class. For example, a format, a data type, or even a term used to label a column, may be identified within the data set and subsequently compared to a catalogue of known classes to identify the particular attribute. Descriptions of the data within a particular attribute may include a wide variety of statistics, commonalities, and metadata, and as previously indicated, beyond the data class may also include: a number and/or percentage of distinct entries within the attribute, a number and/or percentage of null values within the attribute, data formats, data types, and data quality.

Deduplication program 102 utilizes the collected data profile to determine weights (step 308) for each of the attributes. The determined weights will influence the importance placed on each of the attributes in subsequent matching processes. Exemplary implementation and additional detail is provided subsequently with reference to the flowchart depicted in FIG. 4.

Deduplication program 102 matches duplicative entries (step 310) within the data set based, at least in part, on the determined weights. In a very simple implementation, specific attribute values of one record are compared the attribute values of all other records. Each record would be assessed sequentially. Weighting factors would be applied to determined match scores. In another embodiment, a more nuanced matching process may be utilized. More specifically, matching process 112 may try to intelligently group the existing records with records that have a higher probability of being a match. Records in such a group may be compared to one another, and comparison to every record in a large data set can be avoided. In one implementation of such an embodiment, identifying match candidates involves two steps:

1. Sort the data set by a key (which can be derived from, for example, values listed in one or more columns). This may increase the likelihood that records near each other in the data set are more likely to be a match.
2. Using a moving window (e.g., a defined number of rows), compare each record in the sorted list from step 1 with a limited number of records preceding and following the record as defined by the size of the window. This may also be referred to as "bucketing."

The weighting factors derived using the data profile may also be useful for grouping data records. More specifically, a "higher value" column, for example, may be used as a key column for the sort process in order to maximize the probability of having duplicates in the same general areas of the sorted list.

In any event, as match scores are determined, the weights of the attributes being compared are factored in to provide a more accurate assessment of a duplicative entry.

In one matching implementation, a probabilistic matching algorithm may also consider the frequency of values used within a particular field. If, for example, a specific value is highly unique (e.g., is not often duplicated), having two data records with the same attribute value may be a strong indication that the two records are duplicative. For example, two instances of the same phone number are more indicative of a record match than two instances of the same gender. And knowledge of the general frequency or infrequency of repeats within an attribute, without regard or knowledge to what the actual field is, would dictate the same results. However, situations may occur in which such a probabilistic matching algorithm over-influences the end result. For example, a typo that creates a match to a unique record, or even two records that contain a similar typo, might lead the probabilistic matching algorithm to conclude that the match is a strong indicator of a potential duplicate because the data value is equal for the two rows and not frequent for the rest of the data. However, the additional column weights may provide the added benefit of reducing such undue influence. For example, if the column is weighted low and contains largely irrelevant information that is not overly useful in identifying an entity, even this unique match would not throw the result. Similarly, even if the column did end up contributing a fair amount of weight (like a phone number might), other attributes that were heavily weighted but that did not indicate a match would serve to counteract the error.

If an entry is determined to be duplicative, deduplication program 102 deduplicates the match entry (step 312) by removing the duplicate or merging the duplicated entries into a single entry.

Figure 4:
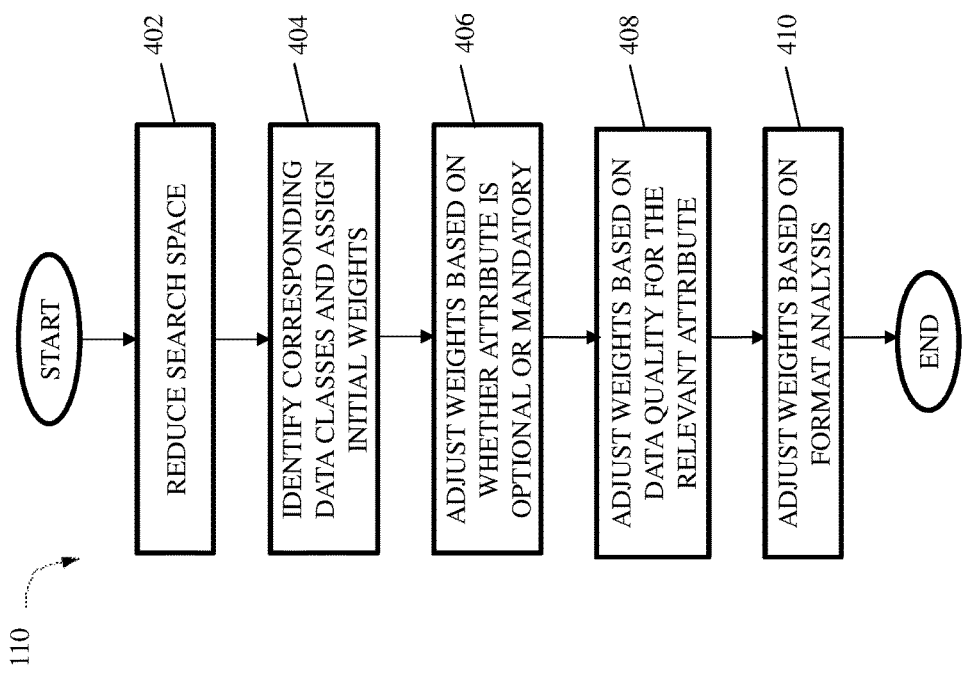
FIG. 4 is a flow diagram describing a weighting process for a data set undergoing data deduplication, in accordance with one embodiment of the present invention.

FIG. 4 depicts an illustrative flow diagram of weighting process 108, also corresponding to step 308 of FIG. 3, in accordance with an embodiment of the present invention.

In one implementation, weighting process 108 reduces the search space (step 402) by removing irrelevant or lower value attributes from consideration. This may ultimately be accomplished in a number of different ways, including, for example, actual removal from the data set, creating a copy of the data set without the attributes, or associating the attribute with an indicator or weight signaling to a subsequent matching process that a particular attribute should be disregarded for matching purposes (e.g., a '0' weight). A person of skill in the art will recognize that other methodologies exist and may be used to filter out such identified attributes.

Designation of an attribute being low value or irrelevant is largely based on information collected during the data profiling process. In one embodiment, if all values for a given attribute are consistent or equal (for example, all values in the column are null, or in a particular data set all records are for females), then comparison of that particular attribute in a matching process would be unhelpful and inefficient. Providing such an attribute a low weight, preferably to the point of being removed from consideration, can significantly speed up the overall deduplication process. Similarly, if all values for a given attribute are unique, then consideration of that attribute will not produce any matches, and is not likely to be helpful. In one embodiment, such an attribute may also be low weighted and/or removed from consideration. A person of skill in the art will recognize that this may not be appropriate in all implementations, however. Even "unique" attributes may display a high degree of similarity to each other, which could, for instance, be indicative of a mistake in data entry of two duplicative records. Other examples of attributes that may be removed from consideration in various embodiments include: attributes where values have a functional dependency on another attribute; an attribute that is largely not used (e.g., having a low completeness percentage); and attributes where the data quality is poor. Decisions between a low weight and removal from consideration may ultimately rest on designated thresholds of acceptability.

Weighting process 110 may identify data classes corresponding to the attributes and assign weights based on the identified data class (step 404). As described with regard to FIG. 3, a data profiling process may be used to classify the attributes of a particular data set. Weighting processes 110, in one embodiment, may access the classifications and use them to provide an initial weight to the attributes. In another embodiment, an initial weight may already be provided to each attribute, and the weight may be modified or adjusted based on the identified data class. In yet another embodiment, initial weights may be provided based on an identified data class, and any attributes which could not be classified are provided a common "default" weight.

In one implementation, with the data class for an attribute identified, a corresponding weighting factor may be determined by accessing a lookup table that maintains correlations between specific data classes and appropriate weights. In another embodiment, the lookup table may instead provide a criticality or relevance indicator, and the weight may be derived from the indicator. For example, the weight assigned to a specific data class may be dependent on the data classes of the other record attributes being utilized in the calculation, and their respective degree of relevance.

In one embodiment, the provided weights or relevance indicators may be prepopulated into such a table by a user. In another embodiment, data processing system 100 may utilize deduplication program 102 or a separate program to analyze results of previous deduplication runs. Where previous executions of a deduplication process have identified two records as being directed to the same entity, data processing system 100 can do a statistical analysis of which attributes had matching values, or highly similar values, and by ultimately determining which attributes are more likely to indicate a record match if similar or the same. A similar analysis may also indicate attributes that when different are highly indicative of no duplication between to records. A lookup table may be populated with appropriate weights or degrees of relevance based on this analysis. Further, in one embodiment, the lookup table could be updated after every run of deduplication program 102 such that the accuracy of the initial weights/relevance indicators continues to improve with each subsequent iteration of the program.

In some embodiments, a single data class may provide different weighting factors to be given, that are dependent on whether there is a match or a mismatch. For example, a mismatch in a "gender" attribute may be a strong indicator that two records are not duplicative, as this particular field is not likely to change over time. However, a gender match, on the other hand, between the two records is not highly indicative of a record match. Thus, a higher weight may be given to a mismatch in gender, and a lower weight may be given to the attribute if the values match.

Weighting process 110 may, in various embodiments, subsequently adjust the weight given to an attribute based on one or more determinations including, for example, whether an attribute is an optional data field or mandatory (step 406), data quality (step 408), and format analysis (step 410). For example, metadata collected with a data profile of the data set may provide an indication of mandatory and optional fields. Alternatively, mandatory vs. optional status may be indicated by the data class and/or associated with the data class in a lookup table. Mandatory fields are not only likely to be of higher importance, but, due to their status, more data (and hence statistical analysis) is likely to be collected over time, giving a higher degree of credibility to an initial weight. Similarly, a high data quality rating for the attribute (e.g., data values largely conform to expectations for the data within the attribute), adds credibility to results obtained from the matches and mismatches when comparing corresponding values from separate records. Finally, and related to data quality in some respects, if an attribute has no recognizable format (unable to be normalized, open text field, etc.) strict comparison is not the most appropriate and exact matches unexpected, and thus, any corresponding weight may be lowered.

While in a preferred embodiment, weighting process 110 determines and provides the weights for the subsequent matching processes without intervention, in an alternate embodiment, the determined weight may be adjustable by user.

FIG. 5 depicts a block diagram of components of data processing system 100, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Data processing system 100 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media. Memory 506 and persistent storage 508 may be logically partitioned and allocated to one or more virtual machines and/or virtual volumes.

Computer programs and processes are stored in persistent storage 508 for execution by one or more of the respective computer processors 504 via one or more memories of memory 506. For example, programs and processes 102, 106, 108, 110, and 112, as well as data set 104, may be stored in persistent storage 508. In one embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 408.

Communications unit 510, in these examples, provides for communications with other data processing systems or devices. In these examples, communications unit 510 includes one or more network interface cards. Communications unit 510 may provide communications through the use of either or both physical and wireless communications links. Computer programs and processes may be downloaded to persistent storage 508 through communications unit 510.

I/O interface(s) 512 allows for input and output of data with other devices that may be connected to data processing system 100. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 508 via I/O interface(s) 512. I/O interface(s) 512 may also connect to a display 520.

Display 520 provides a mechanism to display data to a user and may be, for example, a computer monitor.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable media having computer readable program code/instructions embodied thereon.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for identifying potentially duplicative records in a data set, the computer system comprising:
   one or more computer processors;
   one or more computer-readable storage media;
   program instructions, stored on at least one of the one or more computer-readable media for execution by at least one of the one or more computer processors, the program instructions comprising:
   program instructions to collect a data profile on the data set, where the data set comprises a plurality of data records organized by distinct attributes, such that separate elements of each record belong to a distinct attribute of the data set, and where the data profile provides descriptive information regarding the attributes, including at least a data classification for one or more of the attributes;
   program instructions to automatically determine a weight to be associated with a set of attributes based, at least in part, on the data profile;
   program instruction to determine that all data elements associated with a first attribute of the set of attributes have the same value and a corresponding low weight;
   program instructions to remove, prior to deduplication and in response to determining that all data elements associated with the first attribute have the same value and a corresponding low weight, the first attribute from consideration with regard to duplicate record comparisons by removing the first attribute from the set of attributes;
   program instructions to compare a first set of elements of a first record of the data set to a second set of elements of a second record of the data set, where both the first and second sets of elements set of attributes of the data set, to determine a degree of similarity between corresponding elements in the first and second sets of elements; and
   program instructions to determine a likelihood that the first and second records are duplicative over each other, based, at least in part, on the degree of similarity between the compared elements, where the effect that the degree of similarity between any two compared elements has on the overall determination as to the likelihood that the first and second records are duplicative is increased or decreased based on the determined weight associated with the attribute that corresponds to the two compared elements.

2. The computer system of claim 1, further comprising program instructions, stored on at least one of the one or more computer-readable media for execution by at least one of the one or more computer processors, to normalize data elements, across the plurality of data records, associated with a particular attribute.

3. The computer system of claim 1, wherein the data profile further includes one or more descriptors for a particular attribute selected from the group consisting of: a number of distinct data elements associated with the particular attribute, a number of null values for elements associated with the particular attribute, a percentage of null values for elements associated with the particular attribute out of a total number of records, data format for elements associated with the particular attribute, data type for elements associated with the particular attribute, and data quality for elements associated with the particular attribute.

4. The computer system of claim 1, wherein the program instructions to automatically determine the weight to be associated with the set of attributes comprise:
   program instructions to identify a data classification from the data profile for the set of attributes; and
   program instructions to determine, based on the identified data classification, a corresponding weight.

5. The computer system of claim 4, wherein the program instructions to automatically determine the weight to be associated with the set of attributes further comprise:
   program instructions to adjust the corresponding weight up or down based on a determination of whether each attribute of the set of attributes is an optional field or a mandatory field; and
   program instructions to adjust the corresponding weight up or down based on data quality of the data elements associated with each attribute of the set of attributes.

6. The computer system of claim 1, wherein the program instructions to determine the weight to be associated with the set of attributes comprise:
   program instructions to access a lookup table, wherein the lookup table maintains a correlation between specific data classes and appropriate weights assigned to each specific data class.

7. The computer system of claim 6, wherein the lookup table includes a criticality indicator for assessing specific data classes, the criticality indicator being prepopulated with appropriate weights based on a statistical analysis of a previous deduplication process, wherein the weight to be associated with a particular attribute is derived from utilizing the criticality indicator.

8. The computer system of claim 1, wherein the program instructions to collect a data profile on the data set comprise:
   program instructions to collect a first data profile on a raw data set;
   program instructions to normalize the raw data set to generate a normalized raw data set;
   program instruction to collect a second data profile on the normalized raw data set;

program instructions to create a complete data profile from the first data profile and the second data profile.

9. A computer program product for identifying potentially duplicative records in a data set, the computer program product comprising one or more computer-readable storage media, and program instructions, stored on the one or more computer-readable media, the program instructions comprising:
program instructions to collect a data profile on the data set, where the data set comprises a plurality of data records organized by distinct attributes, such that separate elements of each record belong to a distinct attribute of the data set, and where the data profile provides descriptive information regarding the attributes, including at least a data classification for one or more of the attributes;
program instructions to automatically determine a weight to be associated with a set of attributes based, at least in part, on the data profile;
program instruction to determine that all data elements associated with a first attribute of the set of attributes have the same value and a corresponding low weight;
program instructions to remove, in response to determining that all data elements associated with the first attribute have the same value and a corresponding low weight, the first attribute from consideration with regard to duplicate record comparisons by removing the first attribute from the set of attributes;
program instructions to compare a first set of elements of a first record of the data set to a second set of elements of a second record of the data set, where both the first and second sets of elements are associated with the set of attributes of the data set, to determine a degree of similarity between corresponding elements in the first and second sets of elements; and
program instructions to determine a likelihood that the first and second records are duplicative over each other, based, at least in part, on the degree of similarity between the compared elements, where the effect that the degree of similarity between any two compared elements has on the overall determination as to the likelihood that the first and second records are duplicative is increased or decreased based on the determined weight associated with the attribute that corresponds to the two compared elements.

10. The computer program product of claim 9, wherein the data profile further includes one or more descriptors for a particular attribute selected from the group consisting of: a number of distinct data elements associated with the particular attribute, a number of null values for elements associated with the particular attribute, a percentage of null values for elements associated with the particular attribute out of a total number of records, data format for elements associated with the particular attribute, data type for elements associated with the particular attribute, and data quality for elements associated with the particular attribute.

11. The computer program product of claim 9, wherein the program instructions to automatically determine the weight to be associated with the set of attributes comprise:
program instructions to identify a data classification from the data profile for the set of attributes; and
program instructions to determine, based on the identified data classification, a corresponding weight.

12. The computer program product of claim 11, wherein the program instructions to automatically determine the weight to be associated with the set of attributes further comprise:

program instructions to adjust the corresponding weight up or down based on a determination of whether each attribute of the set of attributes is an optional field or a mandatory field; and
program instructions to adjust the corresponding weight up or down based on data quality of the data elements associated with each attribute of the set of attributes.

13. The computer program product of claim 9, wherein the program instructions to determine the weight to be associated with the set of attributes comprise:
program instructions to access a lookup table, wherein the lookup table maintains a correlation between specific data classes and appropriate weights assigned to each specific data class.

14. The computer program product of claim 13, wherein the lookup table includes a criticality indicator for assessing specific data classes, the criticality indicator being prepopulated with appropriate weights based on a statistical analysis of a previous deduplication process, wherein the weight to be associated with a particular attribute is derived from utilizing the criticality indicator.

15. The computer program product of claim 9, wherein the program instructions to collect a data profile on the data set comprise:
program instructions to collect a first data profile on a raw data set;
program instructions to normalize the raw data set to generate a normalized raw data set;
program instruction to collect a second data profile on the normalized raw data set;
program instructions to create a complete data profile from the first data profile and the second data profile.

16. A computer program product comprising a computer readable storage medium having program instructions embodied therewith, the program instructions executable by a processor to cause the processor to perform a method comprising:
identifying a data set on which to perform a data deduplication process, wherein the data set comprises a plurality of data records organized by a plurality of attributes;
preparing the data set prior to performing data deduplication, wherein preparing the data set includes:
collecting a data profile on the data set, wherein the data profile provides descriptive information regarding the plurality of attributes;
determining, automatically, a weight to be associated with a set of attributes based, at least in part, on the data profile;
determining that all data elements associated with a first attribute of the set of attributes have an identical value and a corresponding low weight; and
removing, in response to determining that all data elements associated with the first attribute have the same value and a corresponding low weight, the first attribute from consideration with regard to duplicate record comparisons by removing the first attribute from the set of attributes; and
performing data deduplication on the prepared data set using the set of attributes.

17. The computer program product of claim 16, wherein performing the data deduplication comprises:
comparing a first set of elements of a first record of the data set to a second set of elements of a second record of the data set, wherein both the first and second sets of elements are associated with the set of attributes of the data set, to determine a degree of similarity between corresponding elements in the first and second sets of elements; and determining a likelihood that the first and second records correspond to the same entity based, at least in part, on the degree of similarity between the compared elements, wherein the effect that the degree of similarity between any two compared elements has on the overall determination is based on the determined weight associated with the attribute that corresponds to the two compared elements.

18. The computer program product of claim 17, wherein the method further comprises:

merging, in response to the likelihood that the first and second records correspond to the same entity exceeding a threshold, the first and second records in the data set.

19. The computer program product of claim 16, wherein the data profile includes at least a data classification for one or more of the attributes.

* * * * *